UNITED STATES PATENT OFFICE.

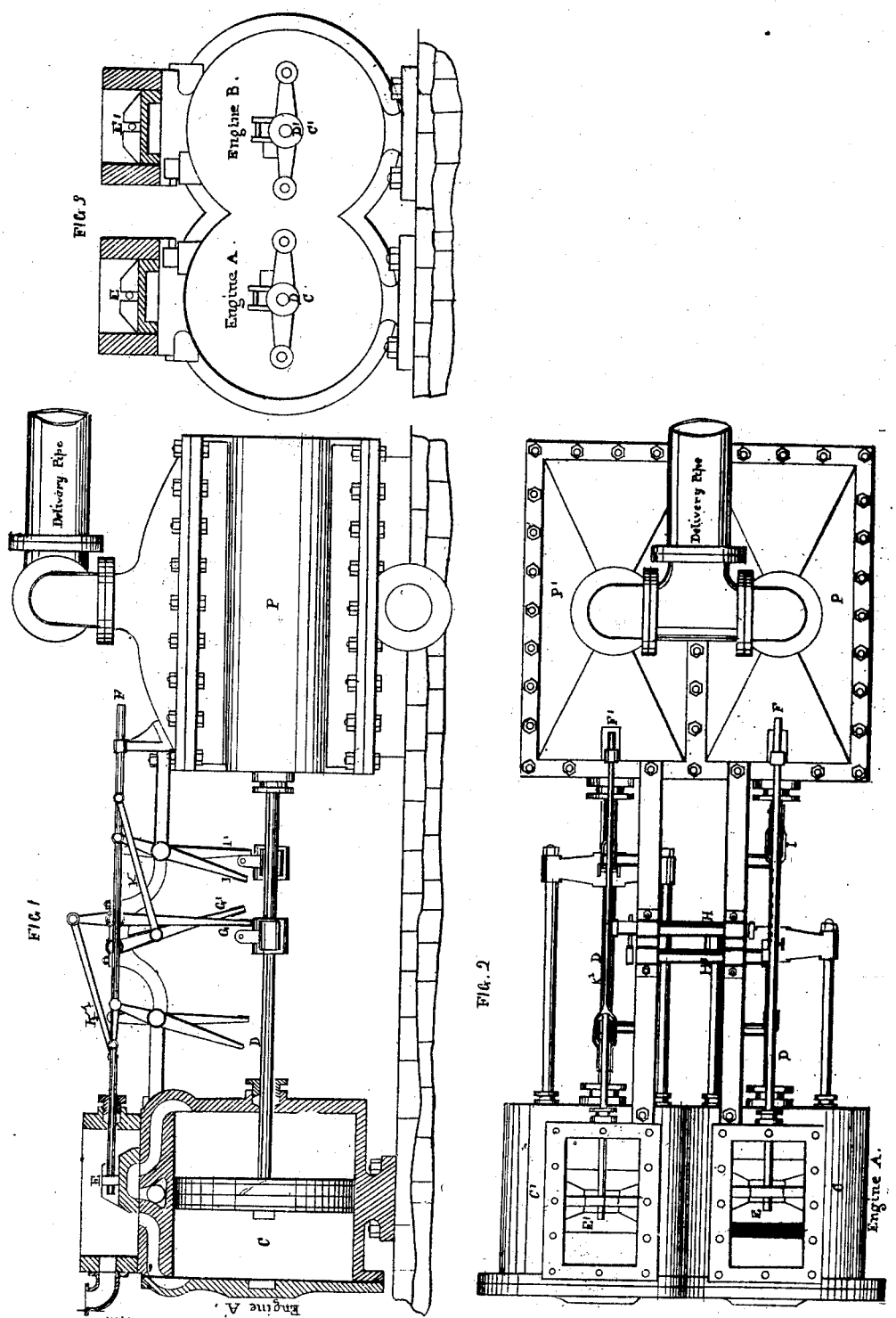

HENRY R. WORTHINGTON, OF BROOKLYN, NEW YORK.

IMPROVEMENT IN PUMPING-ENGINES.

Specification forming part of Letters Patent No. 24,838, dated July 19, 1859

*To all whom it may concern:*

Be it known that I, HENRY R. WORTHINGTON, of Brooklyn, in the county of Kings and State of New York, have invented a new and Improved Combination of Pumping-Engines and Arrangement of the Valve-Motion Therefor; and I do hereby declare that the following is a full and exact description thereof, reference being had to the annexed drawings.

The main feature of this arrangement is the division of the labor to be performed between two working-pistons, which act reciprocally upon each other's steam and exhaust valves. It is applicable to that kind of engine known as "direct acting," which works without the use of a crank or other device for producing rotary motion. The Cornish engine is a familiar example of this variety.

For convenience of reference the pair of engines which form the combination will be designated throughout this specification and in the drawings as engine A and engine B.

Engine A is provided with suitable attachments for actuating the steam and exhaust valves of engine B, and by like attachments the motion of engine B is made to operate upon the steam and exhaust valves of engine A. In addition to this each engine is made to operate upon its own valve at or near the termination of its stroke for the purpose of shutting off the steam and arresting further motion of the piston; but neither engine has command of the motions of the valve or valves belonging to itself, except for the purposes connected with stopping or retarding its own motion. For the better understanding of these effects, the engines shown in the drawings may be considered as in motion.

The same letters in the different figures designate the same parts of the machines.

Figure 1 is a side elevation with cylinders and valve-chests in section. The pistons are of ordinary construction, and the steam-valves of the kind known as "slide-valves." This peculiar kind of valve is only selected and shown as a matter of choice, the invention being plainly applicable to any other kind of valve. The engines are shown as horizontal for the same reason, and not because of inapplicability of the invention to any engine that may be preferred, whether vertical, oscillating, or of any other form.

Fig. 2 is a plan, and Fig. 3 an end elevation, with steam-chest and slide-valves in section.

C C' represent steam-cylinders; P P', pump-chambers; D D', piston-rods; E E', steam slide-valves; F F', valve-rods; G G', swinging levers moving the rock-shafts H H'; I I', stopping-levers for closing steam-valves; K K', links connecting valve-rods and rock-shafts.

Engine A being supplied with steam, its piston commences to move from left to right. At the middle of its stroke or at any other point therein which may be found desirable, it actuates the steam and exhaust valves of engine B by coming in contact with and moving the arm G, which in its turn moves the steam-valve E', with which it is connected by the rock-shaft H and the link K' and valve-rod F'. Still going on, it completes its stroke, and finally terminates its motion by closing its own valve, with the stopping-lever I. Meanwhile the piston of engine B, having been supplied with steam by the movement of engine A, as aforesaid, has commenced its own stroke from left to right. On its way it encounters and moves the valve of engine A by starting and moving G', which, being connected by the rock-shaft H' and link K with the valve-rod F and valve E of engine B, gives the proper motion to the steam slide-valve E. Then it goes on to the end of its stroke, closes its own valve with the lever I' and rests quietly until again called upon to move by the action of engine A. Engine A, having already commenced its return, is followed by B so soon as the point is reached where the steam-valve of B is actuated. In this way one piston takes up its motion, proceeds on its stroke, actuates the valve of the other engine, shuts its own valve, and stops, with no power to move again, except what is derived from the operation of the other engine. The consequence of this reciprocal service rendered by either engine to the other is a motion of the most positive and controllable character, entirely free from shock and from the harshness under which a single direct-action engine labors. For it will be seen that any desired amount of time may be allowed for the repose of the piston at the end of its stroke by arranging to have the other piston act upon the valve sooner or later in its stroke. This is accomplished by suitable adjustments on the levers which actuate the steam-valves, so as to allow of more or less lost motion. For example, the links K K' instead of being rigidly connected to the valve-rods F F' may slide back and forth for a little distance, controlled by screw-stops. Thus one piston may leave the right-hand terminus just as the other arrives, lying inactive during the whole time of a stroke, or the two pistons moving in opposite directions may cross each other at the middle point of the stroke. Within these two extremes a practical time for the repose of the piston will be found that allows all the water-valves to come quietly to their seats, the currents to subside, and equilibrium of pressure to be formed, without the noise and hurtful shocks which follow all attempts to force these results by the sudden reciprocation of a piston. And here an important difference between the character of the motion thus produced and that of any other engine—the Cornish pumping-engine, for example—may be noticed as being the basis of the practical superiority of the arrangement herein described. It is that the two pistons are never at rest at the same time, but that either one or the other is constantly exerting its full effect upon the water-column, preventing it from coming to a state of rest in the forcing tube or main and insuring a constant propulsion and delivery. As regards the arresting of the motion by the action of the engine upon its own valve, it is obvious that some expedients such as a buffing apparatus or dash-pot might be substituted in cases where the smallness of the engines would make the blow insignificant, or where economy in first cost is the great consideration, or a supplementary steam-valve may be employed for the single purpose of admitting sufficient steam at the end of the stroke to arrest the motion of the steam-pistons; but these expedients are not set forth with particularity in this specification, as they are plainly defective in their operation, and not to be used except in the cases cited.

It is of no importance other than connected with mechanical convenience whether the working-cylinders are arranged side by side or end to end or one upon the other. All that is required are two working-engines conveniently arranged for reaching and actuating each other's steam and exhaust valves.

Although the engines herein described are called "steam-engines," it is manifestly easy to employ the elastic force of any other fluid or vapor, or the hydrostatic pressure of a column of water in a similar combination. For this last-named motor it is indeed eminently adapted by its freedom from concussive action.

Having thus fully described my invention, what I claim is—

1. The combination herein set forth and exhibited of two direct-acting pumping-engines propelled by steam or other fluid, so arranged as that each engine shall actuate the inlet and outlet valves governing the motive power of the other, thereby insuring the constant action of at least one pump-piston upon the water and relieving the action of the pump from shocks and concussions.

2. The arrangement herein shown of two distinct systems of levers adapted to the steam and exhaust valves of each engine, the one system to be operated upon for producing motion and for determining the duration of the repose of the piston at the termination of the stroke, the other for bringing the pistons to a state of rest, all substantially as herein explained and set forth.

HENRY R. WORTHINGTON.

Witnesses:
D. L. HINES,
WM. A. PERRY.